(12) United States Patent
Fu et al.

(10) Patent No.: US 11,171,550 B1
(45) Date of Patent: Nov. 9, 2021

(54) MIXED-WAVE PERMANENT MAGNET MOTOR

(71) Applicant: Shenzhen Yiji Manufacturing Co., Ltd., Shenzhen P.R. (CN)

(72) Inventors: Zhenqiang Fu, Shenzhen (CN); Zhaohong Zheng, Shenzhen (CN)

(73) Assignee: Shenzhen Yiji Manufacturing Co., Ltd., Shenzhen (CN)

( * ) Notice: Subject to any disclaimer, the term of this patent is extended or adjusted under 35 U.S.C. 154(b) by 0 days.

(21) Appl. No.: 17/072,839

(22) Filed: Oct. 16, 2020

(30) Foreign Application Priority Data

May 29, 2020 (CN) .......................... 202010478622.0

(51) Int. Cl.
*H02K 16/02* (2006.01)
*H02K 16/00* (2006.01)

(52) U.S. Cl.
CPC ............. *H02K 16/00* (2013.01); *H02K 16/02* (2013.01)

(58) Field of Classification Search
CPC ........ H02K 1/141; H02K 1/143; H02K 1/148; H02K 1/14; H02K 16/00; H02K 16/02; H02K 16/04; H02K 2201/06
See application file for complete search history.

(56) References Cited

U.S. PATENT DOCUMENTS

| | | | | |
|---|---|---|---|---|
| 4,900,965 A * | 2/1990 | Fisher | ...................... | H02K 1/06 310/216.006 |
| 6,472,788 B1 * | 10/2002 | Nakano | ..................... | H02K 1/14 310/112 |
| 7,898,134 B1 * | 3/2011 | Shaw | ...................... | H02K 21/16 310/114 |
| 2002/0163270 A1 * | 11/2002 | Almada | .................. | H02K 1/278 310/156.47 |
| 2004/0189136 A1 * | 9/2004 | Kolomeitsev | .......... | H02K 3/345 310/216.082 |
| 2006/0061229 A1 * | 3/2006 | Suzuki | .................... | H02K 1/148 310/216.008 |
| 2006/0131985 A1 * | 6/2006 | Qu | ........................... | H02K 1/14 310/266 |
| 2008/0036215 A1 * | 2/2008 | Gizaw | .................... | H02K 29/03 290/55 |
| 2011/0210633 A1 * | 9/2011 | Lu | .......................... | H02K 1/148 310/114 |

(Continued)

FOREIGN PATENT DOCUMENTS

GB          2082400 A    *  3/1982   ........... H02K 15/095
GB          2459061 A    *  10/2009

*Primary Examiner* — Quyen P Leung
*Assistant Examiner* — Eric Johnson
(74) *Attorney, Agent, or Firm* — Getech Law LLC; Jun Ye

(57) ABSTRACT

The present invention discloses a new type of mixed-wave permanent magnet motor, which relates to the field of motor technology. It comprises a motor shell, a stator and a rotor, wherein, the stator and the rotor are arranged in the motor shell; the stator comprises a fixed ring and stator iron cores, a plurality of the stator iron cores are distributed on a cover plate in circular mode, and the stator iron cores are wound with magnetic induction lines passing through the coils at both radial sides of stator iron cores; the rotor comprises an outer rotor part and an inner rotor part, and the outer rotor part is arranged outside the cylindrical inner rotor part; a stator zone is formed between the outer rotor part and the inner rotor part; the stator is located within the stator zone of the rotor.

3 Claims, 8 Drawing Sheets

(56) References Cited

U.S. PATENT DOCUMENTS

| | | | | |
|---|---|---|---|---|
| 2012/0286616 | A1* | 11/2012 | Li | H02K 21/029 |
| | | | | 310/191 |
| 2012/0299409 | A1* | 11/2012 | Choi | H02K 21/12 |
| | | | | 310/64 |
| 2016/0322873 | A1* | 11/2016 | Udo | H02K 1/278 |
| 2016/0376741 | A1* | 12/2016 | Kim | H02K 1/148 |
| | | | | 310/90 |

* cited by examiner

MIXED-WAVE PERMANENT MAGNET MOTOR

TECHNICAL FIELD

The present invention relates to the technical field of motor, and in particular, to a new type of mixed-wave permanent magnet energy-saving motor.

BACKGROUND ART

The traditional permanent magnet motor can be divided into internal rotor motor and external rotor motor according to the position of the rotor, wherein the rotor is arranged in the circular zone of stators in an internal rotor motor, and the rotor is arranged outside the stators in an external rotor motor. In a traditional permanent magnet motor, the windings on the stator are energized and automatically commutated under the action of magnetic induction hall or magnetic induction coil, which generates a rotating magnetic field of magnetic induction line and drives the rotor to rotate.

When the stator of a traditional permanent magnet motor is energized, only one side of the magnetic field generated by the winding has an effect on the rotor, while the magnetic field on the other side cannot have an effect on the rotor, resulting in a waste of energy.

SUMMARY

To overcome the defects of the existing technology, the technical problem to be resolved in the present invention is: how to use the magnetic fields on both sides of the stator winding to drive the rotor.

To achieve this, the present invention adopts the following technical scheme:

The new type of mixed-wave permanent magnet energy-saving motor comprises a motor shell, a stator and a rotor, wherein the stator comprises a plurality of circularly distributed stator cores, and the stator cores are wound with magnetic induction lines passing through the coils at both sides thereof; the rotor comprises an outer rotor part, inner outer part and a flange; the external rotor part is arranged outside the cylindrical inner rotor part, a stator zone is formed between the outer rotor part and the inner rotor part, the stator is arranged in the stator zone of rotor, and the outer rotor part and the inner rotor part are connected by flange; the inner side of the outer rotor part and the outer side of the inner rotor part are provided with a plurality of circularly distributed permanent magnet modules, and two adjacent permanent magnet modules have opposite polarity.

Beneficially or exemplarily, the stator also includes a fixing ring on which a plurality of the stator iron cores are distributed, and the stator also comprises a fixing support for fixing the stator iron cores on the fixing ring; the stator iron cores are a I-shaped structure, which comprises a first arch part, a second arch part and a middle part connecting the first arch part and the second arch part, the coils are winding on the middle part with slots on both sides, the first arch part faces towards the outer rotor part, and the second arch part faces towards the inner rotor part; a fixing hole of the first arch part vertically runs through the first arch part, and the fixing support is fixedly connected to the fixing ring after passing through the fixing hole.

Beneficially or exemplarily, each of the permanent magnet modules comprises a plurality of permanent magnets, wherein the permanent magnets of each permanent magnet module of the inner rotor part are vertically mounted along the outer side of the inner rotor part and the permanent magnets of the outer rotor part are inclinedly mounted along the inner side of the outer rotor part.

Beneficially or exemplarily, each of the permanent magnet modules includes a plurality of permanent magnets, wherein the permanent magnets of each permanent magnet module of the inner rotor part are inclinedly mounted along the outer side of the inner rotor part and the permanent magnets of the outer rotor part is vertically mounted along the inner side of the outer part.

Beneficially or exemplarily, the angle of inclination of the inclinedly mounted permanent magnets of is 5 to 15 degrees.

Beneficially or exemplarily, the permanent magnet modules of the inner rotor part and the outer rotor part have corresponding position and identical quantity, and the permanent magnet modules at the corresponding positions of the inner rotor part and the outer rotor part have opposite polarity facing towards the stator zone.

Beneficially or exemplarily, a plurality of permanent magnets of the permanent magnet module of the inner rotor part are vertically mounted along the outer side of the inner rotor part, and a plurality of permanent magnets of the permanent magnet module of the outer rotor part are vertically mounted along the inner side of the outer rotor part.

Beneficially or exemplary, it also includes a rotating shaft connected to the inner rotor part through the frontend cover and connected to the frontend cover by rotation of a bearing, and the stator is fixedly mounted on the frontend cover.

The beneficial effect of the present invention:

By designing the structure of the stator and rotor, the present invention makes full use of the magnetic field on both sides of the stator acting with the inner rotor part and the outer rotor part, and the overall output power of the motor is equal to the sum of the powers of the inner rotor part and the outer rotor part, making full use of the magnetic field on both sides of the stator and avoiding the waste of energy.

10—motor shell; 20—stator; 21—fixing ring; 22—stator iron core; 221—first arch part; 222—second arch part; 223—middle part; 224—fixing hole; 23—coil; 24—fixing support; 30—rotor; 31—outer rotor part; 32—inner rotor part; 33—flange; 34—rotating shaft; 35—permanent magnet module; 36—stator zone; 40—frontend cover; 50—rear end cover.

DETAILED DESCRIPTION

Figure 1:
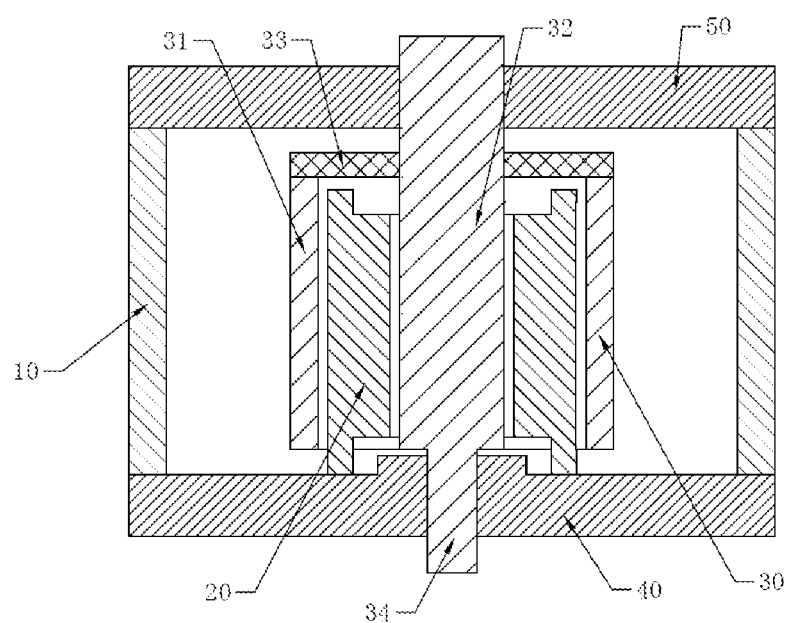
FIG. 1 is a sectional view of the structure of a new mixed-wave permanent magnet energy-saving motor in an embodiment of the present invention.
Figure 2:
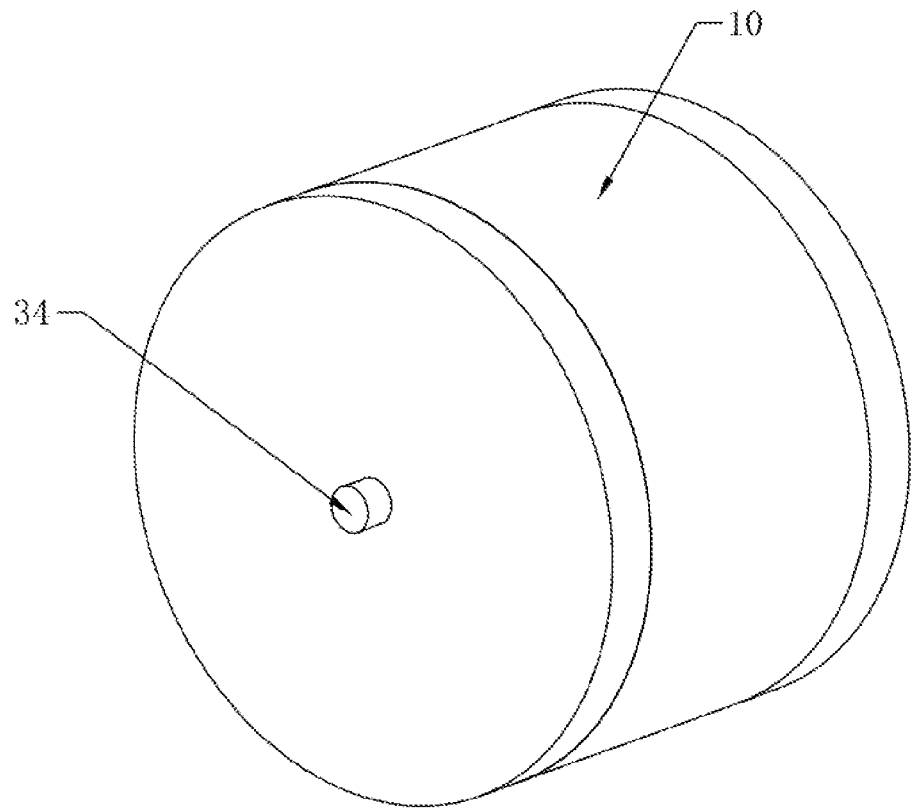
FIG. 2 is a structural stereogram of a new type of mixed-wave permanent magnet energy-saving motor in an embodiment of the present invention.
Figure 3:
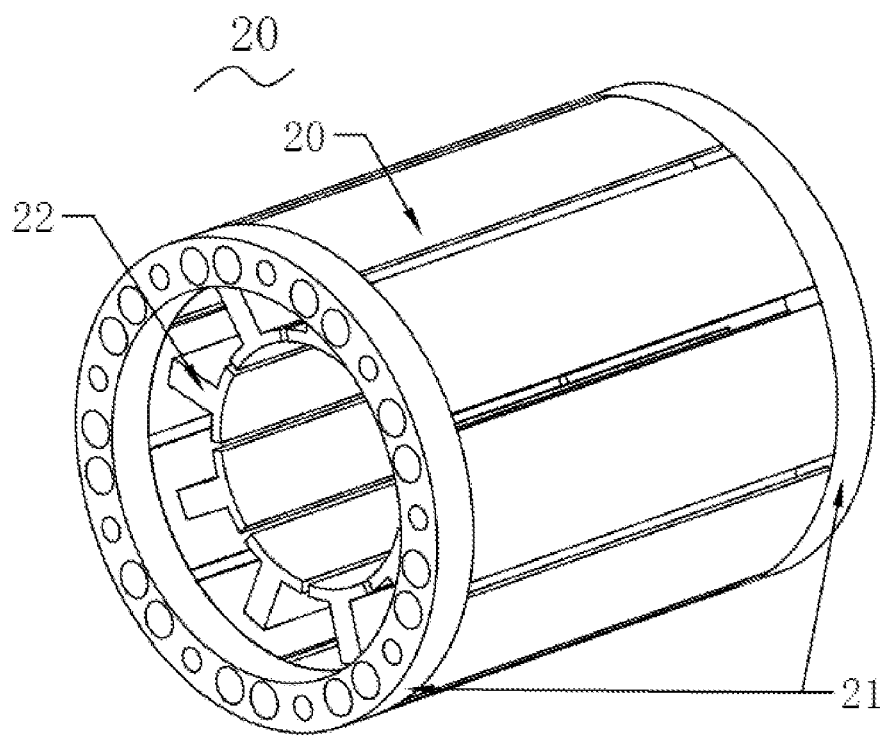
FIG. 3 is a structural view of the stator of a new mixed-wave permanent magnet energy-saving motor in an embodiment of the present invention.
Figure 4:
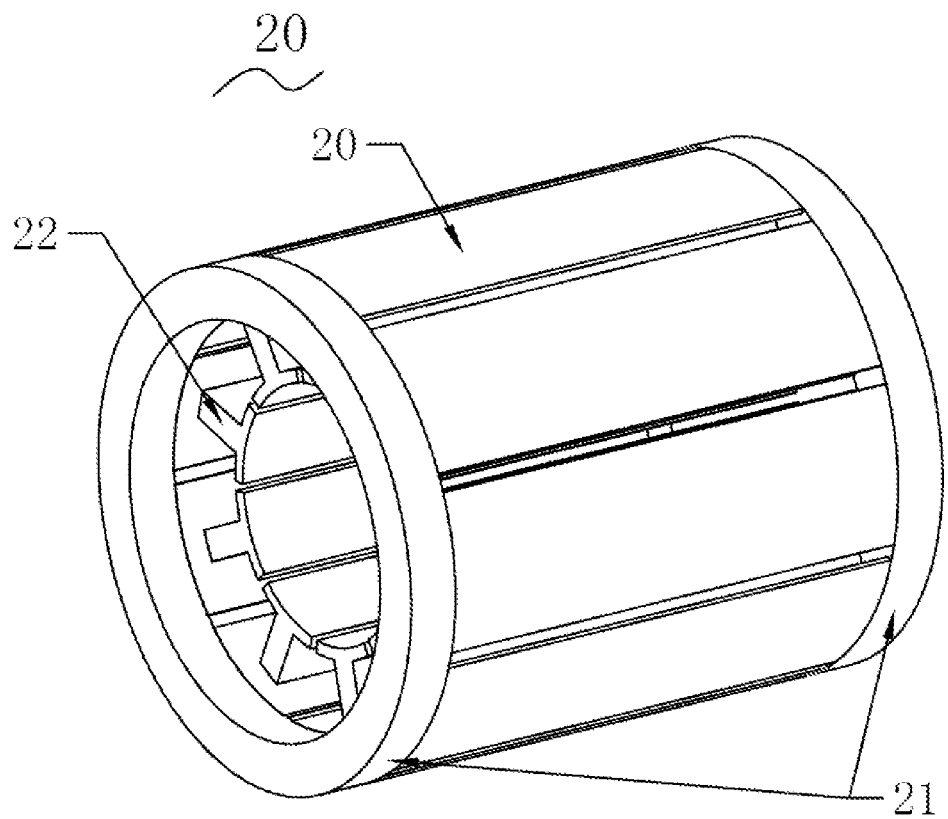
FIG. 4 is another view of the stator of a new mixed-wave permanent magnet energy-saving motor in an embodiment of the present invention.
Figure 5:
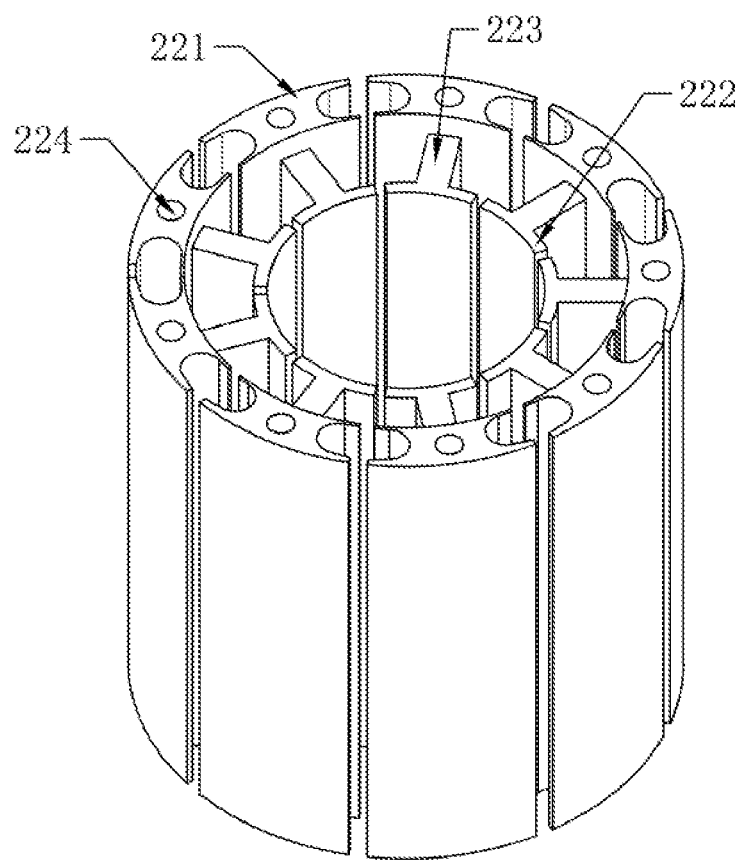
FIG. 5 is a schematic diagram of the stator core distribution of a new mixed-wave permanent magnet energy-saving motor in an embodiment of the present invention.
Figure 6:
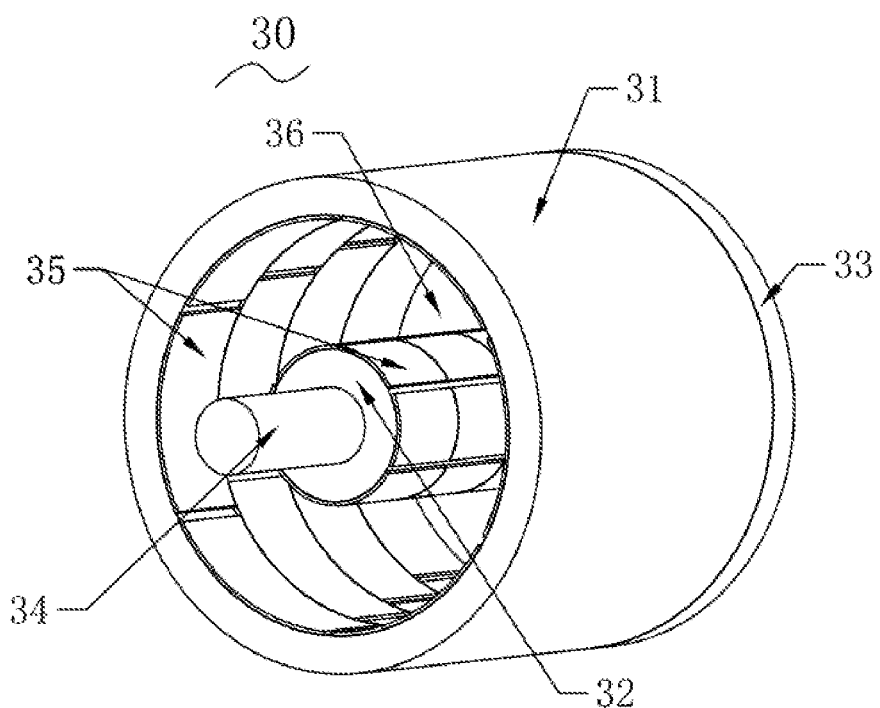
FIG. 6 is a structural diagram of the rotor of a new mixed-wave permanent magnet energy-saving motor in an embodiment of the present invention.
Figure 7:
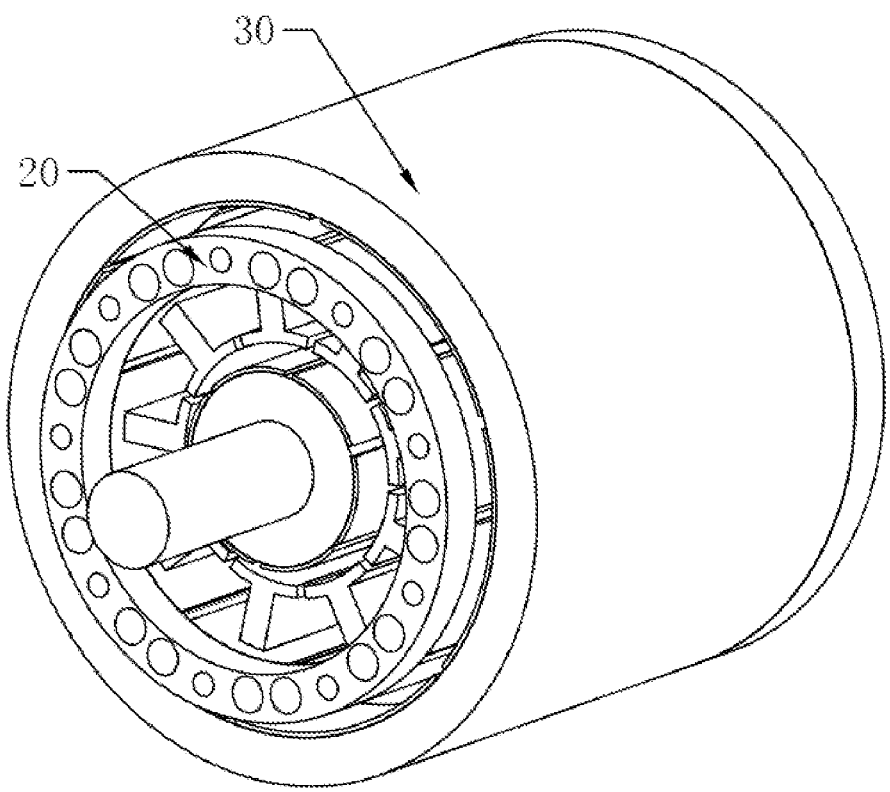
FIG. 7 is a matching diagram of the stator and rotor of a new type of mixed-wave permanent magnet energy-saving motor in an embodiment of the present invention.
Figure 8:
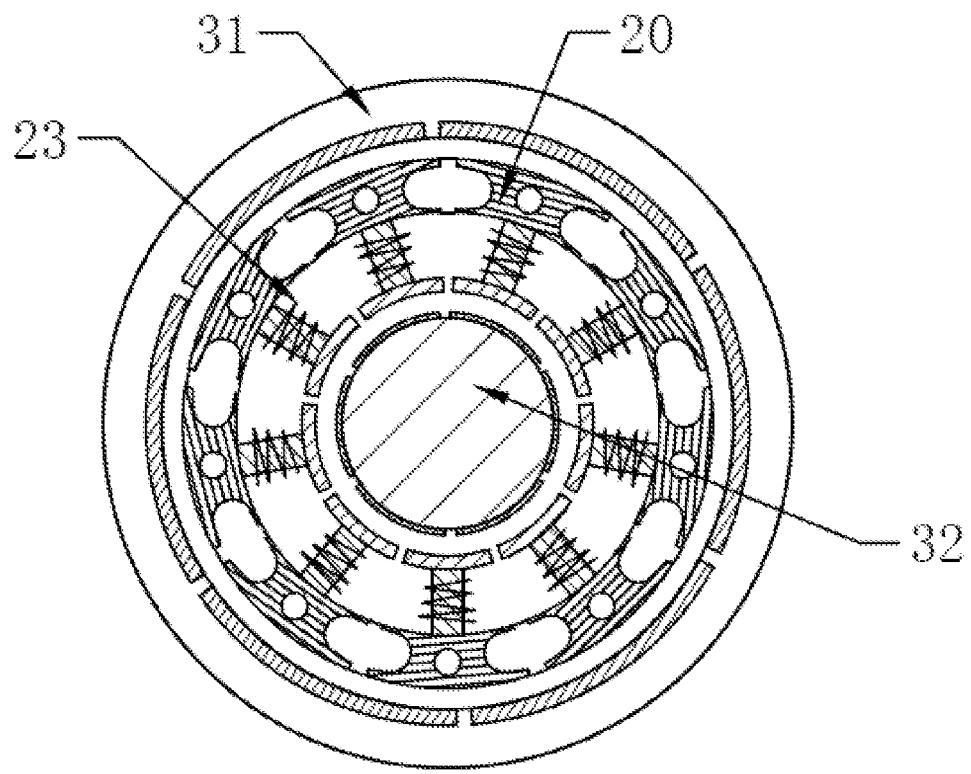
FIG. 8 is a sectional view of the stator and rotor of a new mixed-wave permanent magnet energy-saving motor in an embodiment of the present invention.
Figure 9:
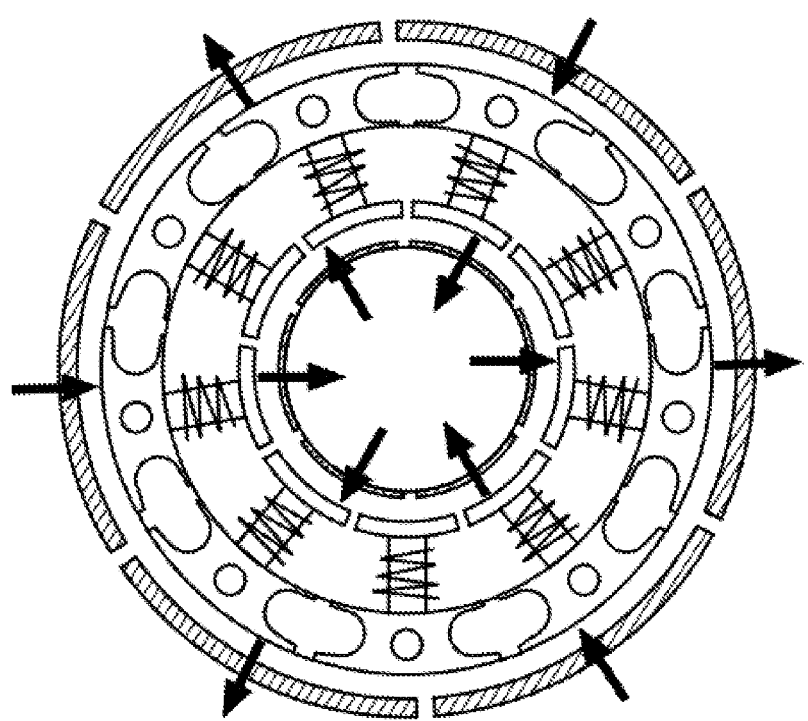
FIG. 9 is a directional diagram of the magnetic induction line of the permanent magnet modules of the inner rotor part and the outer rotor part of a new type of mixed-wave permanent magnet energy-saving motor.
Figure 10:
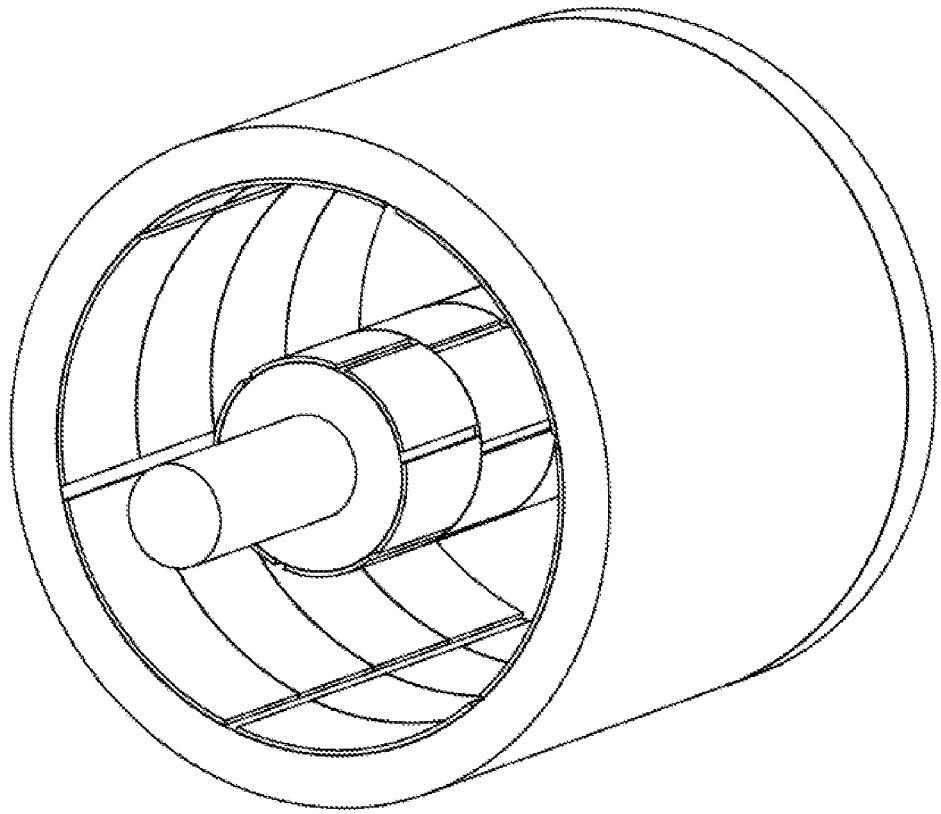
FIG. 10 is a structural diagram of the rotor of a new type of mixed-wave permanent magnet energy-saving motor in an embodiment of the present invention.
Figure 11:
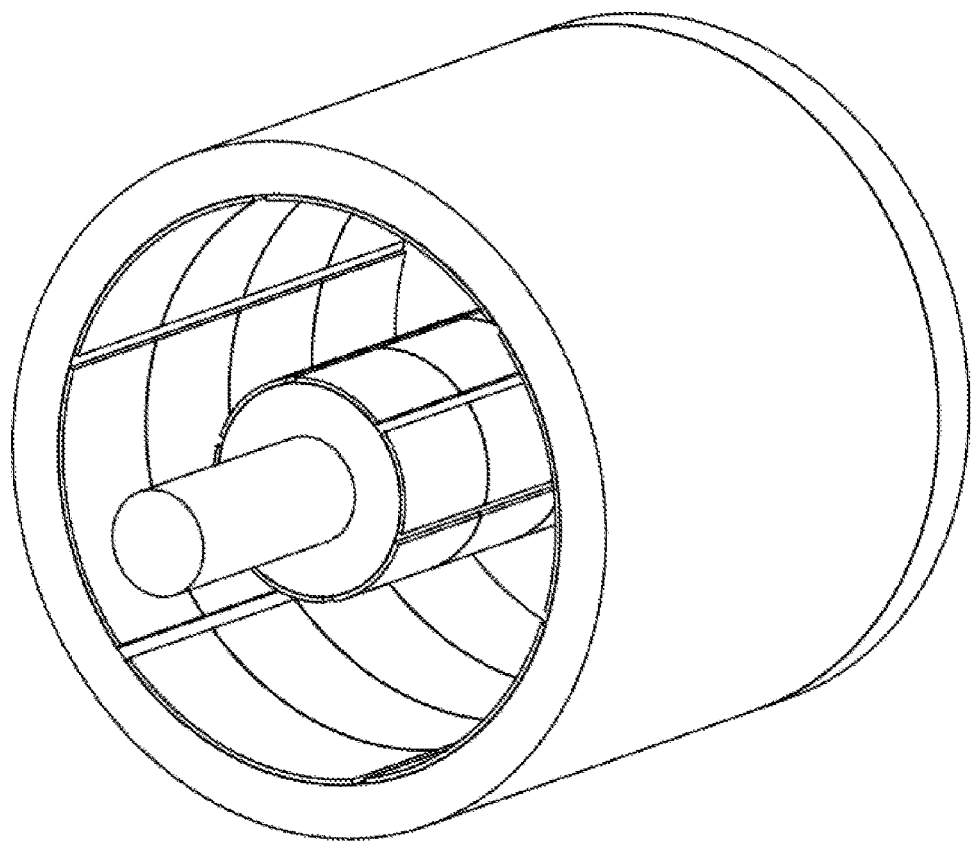
FIG. 11 is a structural diagram of the rotor of a new type of square-wave permanent magnet energy-saving motor in an embodiment of the present invention.
Figure 12:
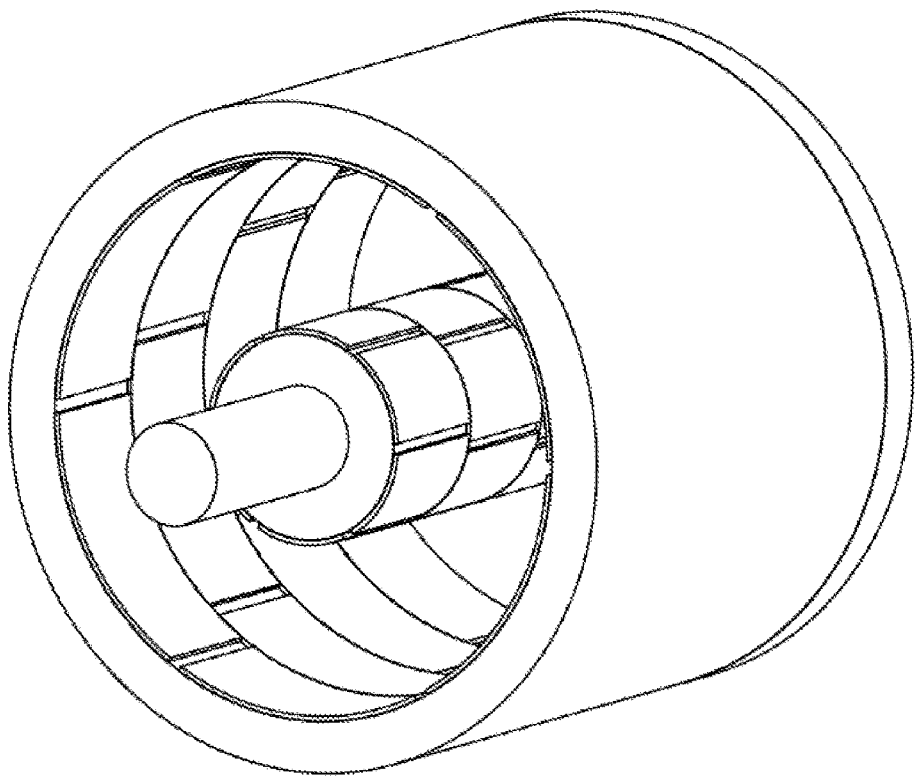
FIG. 12 is a structural diagram of the rotor of a new sinusoidal-wave permanent magnet energy-saving motor in an embodiment of the present invention.
Figure 13:
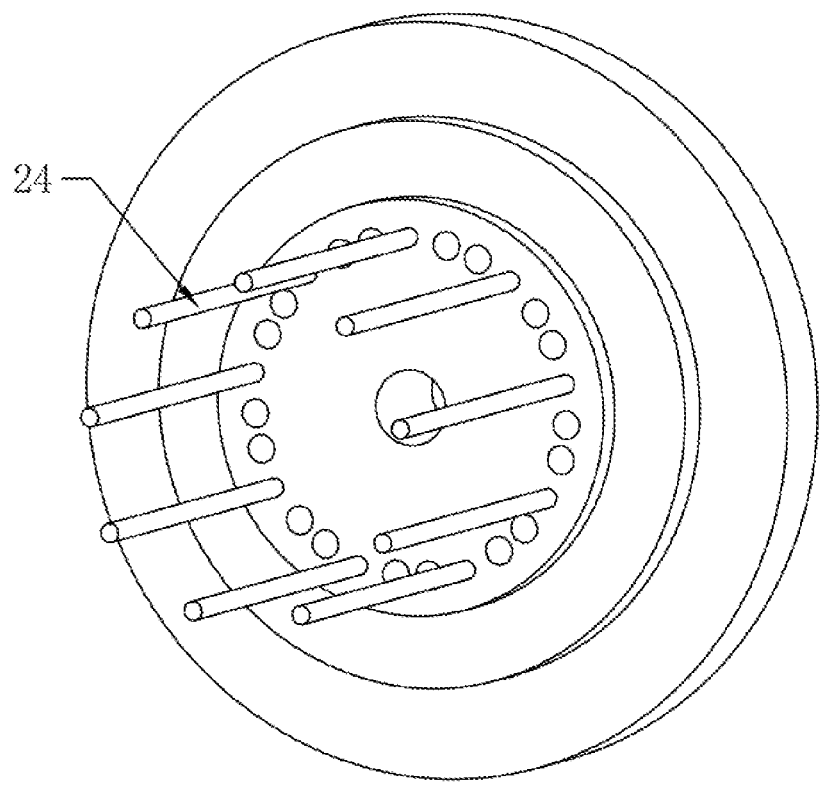
FIG. 13 is a structural diagram of the frontend cover of a new mixed-wave permanent magnet energy-saving motor in an embodiment of the present invention.
Figure 14:
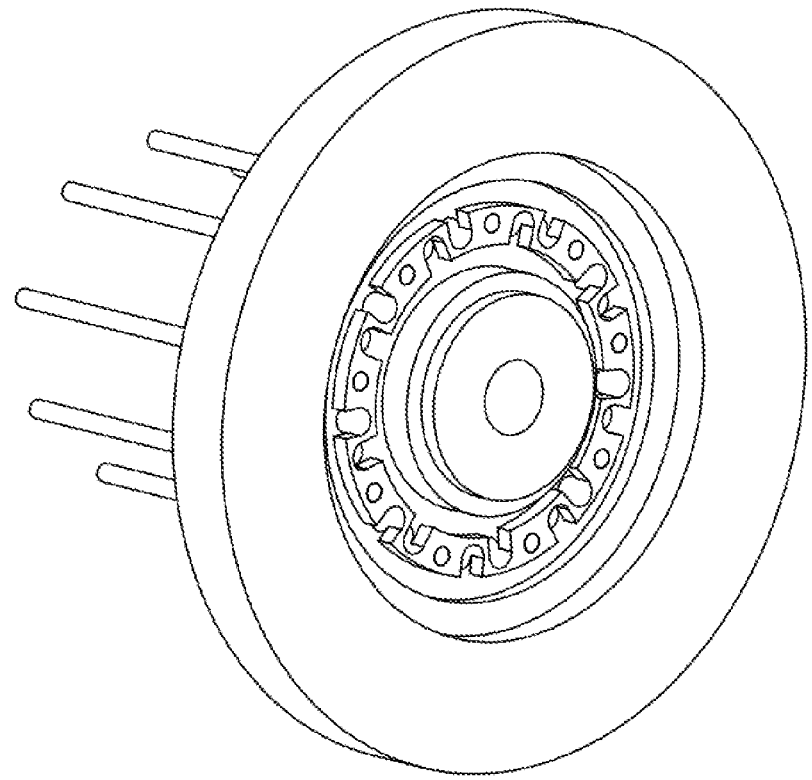
FIG. 14 is another structural diagram of the frontend cover of a new mixed-wave permanent magnet energy-saving motor in an embodiment of the present invention.
Figure 15:
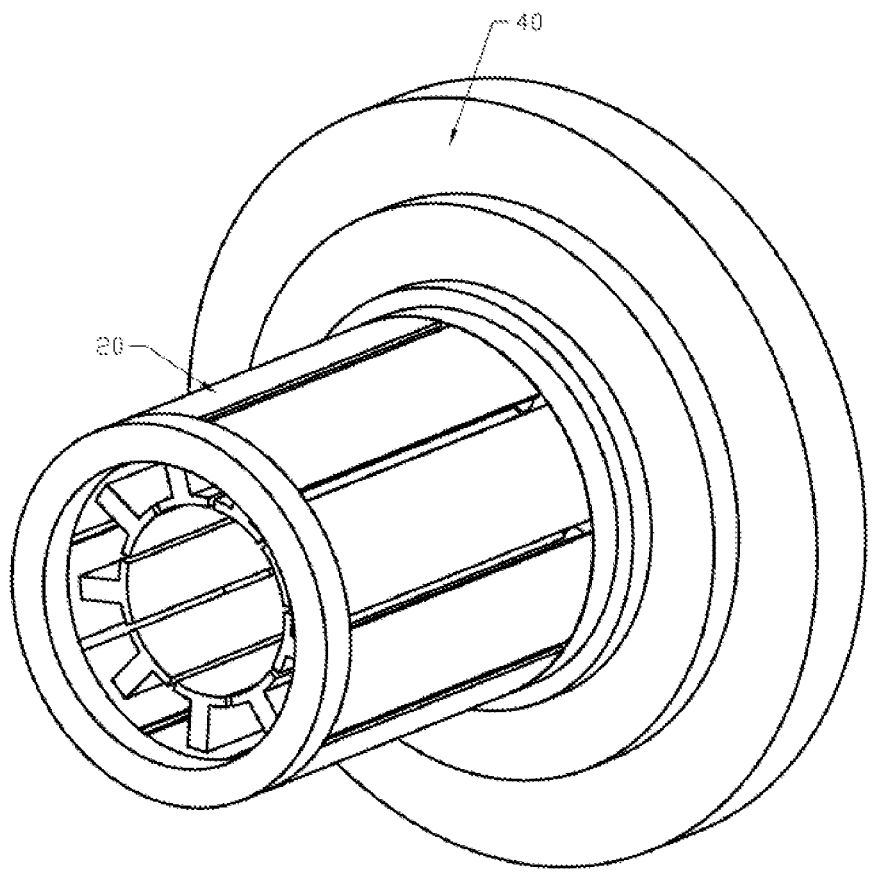
FIG. 15 is a matching diagram of the frontend cover and stator of a new mixed-wave permanent magnet energy-saving motor in an embodiment of the present invention.
Figure 16:
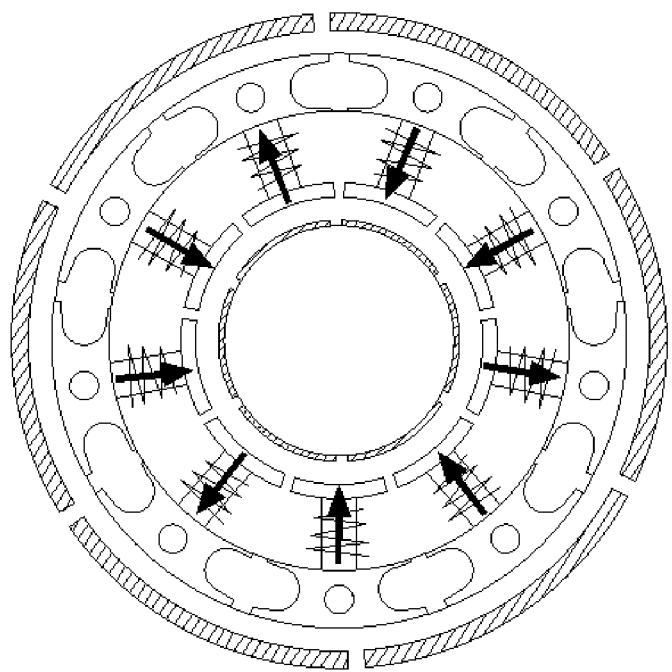
FIG. 16 is a view of the magnetic induction line of the coil on the stator iron core at a certain moment of a new type of mixed-wave permanent magnet energy-saving motor in an embodiment of the present invention.

Explanation to the accompanying drawing:

In FIG. 1, the structural relationship between stator 20 and rotor 30 is shown from a sectional view, and stator 20 is located between the outer rotor part 31 and the inner rotor part 32 of rotor 30. FIG. 2 shows the overall picture of the motor. FIG. 3 and FIG. 4 show the structural relationship of each component of stator 20 from different angles. FIG. 5 shows the distribution relationship of stator iron cores 22 in the stator 20. FIG. 6 shows the structural relationship of each component in the rotor 30. FIG. 6 shows the structure of the rotor of a mixed-wave motor, the permanent magnet modules 35 of the outer rotor part 31 are inclinedly mounted along the side thereof, and the permanent magnet modules 35 of the inner rotor part 32 are vertically mounted along the side thereof. FIG. 7 shows the structural relationship between stator 20 and rotor 30 in three dimensions. FIG. 8 shows the structural relationship between stator 20 and rotor 30 from another sectional view. FIG. 9 shows the direction of the magnetic induction lines of the permanent magnet modules 35 on the inner rotor part 32 and the outer rotor part 31 of rotor 30. FIG. 10-12 show the structure of the rotor in different embodiments of the present invention, wherein FIG. 10 shows the structure of the rotor of a mixed-wave motor, FIG. 11 shows the structure of the rotor of a square-wave motor, and FIG. 12 shows the structure of the rotor of a sinusoidal-wave motor. FIG. 13 shows the structure of the fixing support 24 for fixing stator 20 to frontend cover 40. FIG. 14 shows the structure of the frontend cover 40 in FIG. 13 from another view. FIG. 15 shows the structure of frontend cover 40 fixing the stator 20 in FIG. 13. FIG. 16 shows the direction of the magnetic induction line of the coils 23 on the stator 20, wherein each coil 23 acts as a separate magnet emitting magnetic induction lines towards two radial sides of the stator iron core 22.

The technical scheme of the present invention is further explained in combination with the attached drawings and through specific embodiments below.

Embodiment 1

The new type of mixed-wave permanent magnet energy-saving motor in the embodiment comprises a motor shell 10, a stator 20 and a rotor 30, and the stator 20 and the rotor 30 are arranged in the motor shell 10, wherein the stator 20 includes a plurality of circularly distributed stator iron cores 22, and the stator cores 22 are wound with magnetic induction lines passing through the coils 23 at both radial sides thereof; the rotor 30 includes an outer rotor part 31, an inter rotor part 32 and a flange 33; the circular outer rotor part 31 is arranged outside the cylindrical inner rotor part 32, a stator zone 36 is formed between the outer rotor part 31 and the inner rotor part 32, the stator 20 is arranged in the stator zone 36 of the rotor 30, and the outer rotor part 31 and the inner rotor part 32 are connected by flange 33; the inner side of the outer rotor part 31 and the outer side of the inner rotor part 32 are provided with a plurality of circularly distributed permanent magnet modules 35, and two adjacent permanent magnet modules 35 have opposite polarity.

There are various winding modes on stator iron cores, and the ratio of the coils 23 and the permanent magnet module 35 is the same as that of an ordinary motor. In an embodiment, the quantity ratio of the permanent magnet module 35 of the outer rotor part 31, the coil 23 and the permanent magnet module 35 of the inner rotor part 32 is 2:3:2. The quantity ratio may change in other embodiments.

The permanent magnet energy-saving motor in the embodiment can be used as an electric motor and can also be used an electric generator.

When used as an electric motor, the coil 23 of the stator iron core 22 is supplied with a three-phase current. Since the stator iron core 22 is made of magnetic material, after the coil 23 of the stator iron core 22 is energized, the magnetic induction line of the coil 23 can pass through both radial sides of the stator iron core 22, and meanwhile the outer rotor part 31 and the inner rotor part 32 are respectively arranged at both radial sides of the stator iron core 22, thus the magnetic induction line generated by the coil 23 acts on the outer rotor part 31 and the inner rotor part 32 from both radial sides. At this moment, each stator iron core 22 forms a separate magnet, which generates a magnetic field with different phases, wherein the north pole and the south pole are respectively at both radial sides of the stator iron core and respectively face towards the outer rotor part 31 and the inner rotor part 32, the direction and the intensity of the magnetic field generated by the coil 23 on the stator iron core 22 change with time, and the coils 23 of two adjacent stator iron cores 22 have different phases.

When the three-phase current changes, the magnetic field of the stator iron core 22 changes, the stator 20 forms a rotating magnetic field to drive the outer rotor part 31 and the inner rotor part 32 provided with permanent magnet module 35 to rotate.

As FIG. 9 shows the direction of the magnetic induction line of permanent magnet module 35 in an embodiment.

When used as a motor, there are two functions that increase the output power of rotor 20.

First, as described above, since the magnetic induction line passes through the two radial sides of the stator iron core 22, the magnetic induction line of the coil 23 is fully utilized;

the rotating magnetic field drives the inner rotor part 32 and the outer rotor part 23 to rotate simultaneously, and the output power of the rotor 20 is the sum of the output power of the inner rotor part 32 and the outer rotor part 31.

Second, within a certain range of angles, the magnetic induction line of the inner rotor part 32 can enhance the magnetic field generated by the stator iron core 22, thus increasing the force of the magnetic field on the outer rotor part 31. Specifically, when rotor 30 rotates within a certain angle range, the stator core 22 with good magnetic permeability is affected by the magnetic induction line of permanent magnet module 35 of inner rotor part 32, which generates an induced magnetic field. Within this specific angle range, the induced magnetic field generated by stator core 22 is in the same direction as the magnetic field generated by coil 23. At this point, the two magnetic fields are superimposed, and the magnetic field intensity generated on the stator core 22 is equal to the sum of the rotating magnetic field of coil 23 and the induced magnetic field of stator core 22. As a result, the magnetic field generated on the stator core 22 is strengthened, leading to the strengthening of the magnetic field acting on the outer rotor part 31, thereby increasing the acting force on the outer rotor part 31. Similarly, within another specific angle range, the magnetic induction line of the outer rotor part 31 can also enhance the magnetic field generated on the stator core 22, thus enhancing the force exerted by the magnetic field on the inner rotor part 32. In an implementation mode, the period of the three-phase current is adjusted adaptively to obtain the specific angle.

The conditions of obtaining this specific angle: The induction magnetic field generated by the stator core 22 via the permanent magnet module 35 is in the same direction as the rotating magnetic field of the coil 23.

Taking the rotating magnetic field of coil 23 on a stator core 22 enhanced by inner rotor part 32 as an example, the occurrence of one of the specific angles is described: The directional strength of magnetic field on a certain coil 23 varies with time. During a certain period of time, coil 23 on a certain stator core 22 generates a magnetic field in one direction. At the same time, one of the permanent magnet modules with inner rotor part 32 generates a magnetic induction line in a direction opposite to that of coil 23 toward stator zone 36. When the permanent magnet module 35 rotates from one side of the stator core 22 to the position of the opposite stator core 22, the magnetic flux on the stator core 22 increases slightly, so the induction magnetic field of the stator core 22 is opposite to the magnetic field of the permanent magnet module 35. At this point, the direction of the induced magnetic field generated is the same as that of the magnetic induction line of coil 23, thus enhancing the rotating magnetic field of coil 23. In the actual situation, the magnetic field of coil 23 can be effectively enhanced with more positions meeting the occurrence conditions of this particular angle.

Above two actions coordinate with each other, increasing the output power of rotor 30.

Compared with traditional motor, through the structural design of stator 20 and rotor 30 in the embodiment, each stator iron core 22 of the stator 20 is used as a separate magnet winding, thus utilizing the magnetic fields on both sides of the separate electromagnetic windings to drive the outer rotor part 31 and the inner rotor part 32 of rotor 30. In other words, the magnetic fields of stator 20 are used to drive inner rotor part 32 and outer rotor part 31, the overall output power of rotor 30 is equal to the sum of the output power of inner rotor part 32 and outer rotor part 31, which makes full use of the magnetic field on both sides of stator 20 and avoids energy waste. Compared with the traditional motor, the present invention uses fewer winding sets to realize the same power, thus reducing size of stator 20, using fewer winding materials, and realizing higher economic benefit.

When used as a generator, since the stator iron core is made of magnetic material, the magnetic induction lines of the permanent magnet module 35 of the inner rotor part 32 and the outer rotor part 31 can act on the coil 23 through the radial sides of the stator core 22. At this time, when the rotor 30 rotates, the permanent magnet module 35 thereof rotates to form a rotating magnetic field, and the coil 23 on stator 20 generates electromagnetic induction, generating electrodynamic force and outputting electric energy.

Compared with tradition generator, the coil 23 of stator 20 in the embodiment is affected by the magnetic induction line of the permanent magnet module 35 of outer rotor part 31 and the magnetic induction line of the permanent magnet module 35 of inner rotor part 32, and the flux of coil 23 on stator 20 changes more, generating more electrodynamic force.

Embodiment 2

As shown in FIG. 5, a fixing method of stator 20 of a new mixed-wave permanent magnet energy-saving motor is provided in the embodiment. The stator 20 further comprises a fixing ring 21, a plurality of stator iron cores 22 and a fixing support 24, wherein the stator iron cores 22 are circularly distributed on the fixing ring 21, and the fixing support 24 is used for fixing the stator iron cores 22 on the fixing ring 21.

The stator iron core 22 in an embodiment is an I-shaped structure, comprising a first arch part 221, a second arch part 222 and a middle part 223, wherein the middle part 223 connects the first arch part 221 and the second arch part 222, the coil 23 is wound on the middle part 223 with slots at both sides, the first arch part 221 faces towards the outer rotor part 31, and the second arch part 222 faces towards the inner rotor part 32.

In a further implementation, a fixing hole 224 of the first arch part 221 is vertically runs through the first arch part 221, and the fixing support 24 is fixedly connected to the fixing ring 21 after passing through the fixing hole 224, to maintain the relative position of the stator iron cores 22. Preferably, two fixing rings 21 are set, the stator iron core 22 is fixed between the two fixing rings 21, and one end of the fixing support 24 penetrates into the fixing hole 224 from one side of fixing ring 21, going further to extend towards the other fixing ring 21 and to be fixedly connected to the fixing ring 21. Further, the other end of the fixing support 24 is fixed on the frontend cover 40, which is opposite to the backend cover 50 and is arranged on both sides of the motor shell 10 respectively.

Embodiment 3

As shown in FIG. 6, the embodiment provides a new type of mixed-wave permanent magnet energy-saving motor, which can send out mixed waves. FIG. 6 shows the structure of the rotor of a mixed-wave motor, and each permanent magnet module 35 includes a plurality of permanent magnets, wherein the permanent magnets of the permanent magnet module 35 of the inner rotor part 32 are vertically mounted along the outer side of the inner rotor part, and the permanent magnets of the permanent magnet module 35 of the outer rotor part 31 are inclinedly mounted along the inner side of the outer rotor part. Or, FIG. 10 shows the structure of the rotor of another mixed-wave motor, wherein the permanent magnets of the permanent magnet module 35 of the inner rotor part 32 are inclinedly mounted along the outer side of the inner rotor part, and the permanent magnets of the permanent magnet module 35 of the outer rotor part 31 are vertically mounted along the inner side of the outer rotor part.

When used as a motor, the working process of the embodiment is similar to that of the above embodiment 1.

When used as a generator, as the embodiment describes in particular, the inclinedly mounted permanent magnet module 35 can make stator 20 generate sinusoidal-wave alternating current; meanwhile, the vertically mounted permanent magnet module 35 can make stator 20 generate square-wave alternating current. Thus, the stator 20 can generate a mixed wave of sinusoidal wave and square wave, which realizes an output of mixed wave. According to the need, the waveform of alternating current can be selected adaptively to make it suitable for practical application.

In the embodiment, since the output waveform is a mixed wave of sinusoidal wave combined with square wave, the sinusoidal wave controller or square wave controller can be selected when selecting the controller, which improves the applicability of the motor of this embodiment.

Further, the angle of inclination of the inclinedly mounted permanent magnets is 5 to 15 degrees, preferably to be 10 degrees. As shown in FIG. 6 and FIG. 10, the angle of inclination of the inclinedly mounted permanent magnets is 10 degrees.

Further, the number of permanent magnet modules 35 on the inner rotor part 32 and the outer rotor part 31 is the same.

Embodiment 4

The embodiment provides a new type of sinusoidal-wave or square-wave permanent magnet energy-saving motor, which can send out sinusoidal wave or square wave. As shown in FIG. 11 and FIG. 12, the permanent magnet modules 35 of the inner rotor part 32 and the outer rotor part 31 have corresponding position and identical quantity, and the permanent magnet modules 35 at the corresponding positions of the inner rotor part 32 and the outer rotor part 31 have opposite polarity facing towards the stator zone.

When used as a motor in the embodiment, the output power of rotor 30 can be further enhanced as below:

Since the permanent magnet modules 35 at the corresponding positions of the outer rotor part 31 and the inner rotor part 32 have opposite polarity, and the magnetic induction lines of the permanent magnet module 35 of the outer rotor part 31 and the inner rotor part 32 are mutually constrained, thus constraining most of the magnetic induction lines of the permanent magnet module 35 within the corresponding permanent magnet modules 35; therefore, the magnetic induction lines in stator zone 36 are more concentrated and the magnetic field is stronger. Therefore, when coil 23 is energized and generates a rotating magnetic field, the force exerted by the rotating magnetic field on the permanent magnet module 35 on both sides of the rotor is enhanced, thus improving the output power of the rotor.

When used as a generator, it is similar to that used as a motor. There is also the situation that the magnetic induction lines are mutually constrained so that the magnetic induction lines get more concentrated and the output power of generator is enhanced.

In a further implementation, FIG. 12 shows the structure of the rotor of a sinusoidal-wave motor, wherein the permanent magnet modules 35 of the inner rotor part 32 and the outer rotor part 33 are inclinedly mounted along the corresponding side thereof. The permanent magnets of the two parts are preferably to have the same angle of inclination.

In an implementation, the angle of inclination of the inclinedly mounted permanent magnets is 5 to 15 degrees, preferably to be 10 degrees. As shown in FIG. 12, the angle of inclination of the permanent magnets is 10 degrees.

When used as a motor, the working process of the embodiment is similar to that of the above. When used as a generator, sinusoidal-wave alternating current is generated, and the waveform of the sinusoidal wave of the stator 20 is affected by the angle of inclination of the inclinedly mounted permanent magnets of permanent magnet module 35.

According to the actual application, the angle of inclination is selected reasonably.

In another further implementation, FIG. 11 shows the structure of the rotor of a square-wave motor, wherein the permanent magnets of the permanent magnet module 35 of the inner rotor part are vertically mounted along the outer side of the inner rotor part, and the permanent magnets of the permanent magnet module 35 of the outer rotor part are vertically mounted along the inner side of the outer rotor part.

When used as a motor, the implementation is similar to that of the above. When used as a generator, square-wave alternating current is generated in the implementation.

In the implementation, when the permanent magnet modules 35 are vertically mounted, the motor can be used as a damper motor. When used a damper motor, the permanent magnet modules 35 on the inner side of the outer rotor part and the outer side of the inner rotor part 32 have corresponding position and identical magnetic field direction. At his time, due to their corresponding positions, the magnetic fields of the permanent magnet module 35 of the inner rotor part 32 and the permanent magnet module 35 of the outer rotor part 31 can be superposed directly, so that the magnetic field acting on stator 20 is larger than that of one of the permanent magnets mounted inclinedly. When rotor 30 rotates, especially between two permanent magnet modules 35, the magnetic flux of coil 23 on stator 20 changes direction from facing one side to facing the other side, and the numerical value changes greatly, which causes stator 20 to generate a great induced electrodynamic force and prevents rotor 30 from rotating further.

In this embodiment, similarly, since the two parts of permanent magnet module 35 can be superposed. Thus, compared with the traditional damper motor, the induction electrodynamic force generated on stator 20 is larger and the damping effect is better.

Embodiment 5

The embodiment provides a setting method of the rotating shaft of a new type of mixed-wave permanent magnet energy-saving motor, further comprising a rotating shaft 34, wherein the rotating shaft 34 is connected to the inner rotor part and is connected to the frontend cover 40 through rotation of a bearing after passing through the frontend cover 40, and the stator 20 is fixedly mounted on the frontend cover 40.

When a fixing ring 21 is mounted on both vertical sides of the stator iron core 22, the fixing ring 21 facing towards the frontend cover 40 is provided with a hole where the fixing support 24 passes through, the fixing support 24 passes through the hole and penetrates into the fixing hole 224 of the stator iron core 22, and the stator core 22 is extended and fixed on the fixed ring 21 far from the frontend cover 40 of the stator iron core 22.

In this embodiment, a water-cooled heat dissipation structure can be set to dissipate heat from stator 20, whose specific structure is similar to that disclosed by CN204012958U.

The present invention is described by preferred embodiments and is known to the technical personnel in the field that, without deviating from the spirit and scope of the present invention, various changes or equivalent substitutions may be made to these characteristics and embodiments. The present invention shall not be restricted by the specific embodiments disclosed herein, and other embodiments falling within the claims of this application shall fall within the scope of protection of the present invention.

The invention claimed is:

1. A new type of mixed-wave permanent magnet motor, comprising a motor shell, a stator and a rotor, wherein, the stator and the rotor are arranged in the motor shell;

wherein the stator comprises a plurality of circularly distributed stator cores, and the stator cores are wound with magnetic induction lines passing through the coils at both radial sides thereof;

the rotor comprises an outer rotor part, an inner rotor part and a flange; the outer rotor part is arranged outside the inner rotor part, a stator zone is formed between the outer rotor part and the inner rotor part, the stator is arranged in the stator zone of the rotor, and the outer rotor part and the inner rotor part are connected by flange;

a plurality of permanent magnet modules is circularly distributed on the inner side of the outer rotor part and the outer side of the inner rotor part, and two adjacent permanent magnet modules have opposite polarity, wherein each permanent magnet module comprises a plurality of permanent magnets, wherein the permanent magnets of each permanent magnet module of the inner rotor part are vertically mounted along the outer side of the inner rotor part, and the permanent magnets of each permanent magnet module of the outer rotor part are inclinedly mounted on the inner side of the outer rotor part;

or, the permanent magnets of each permanent magnet module of the inner rotor part are inclinedly mounted on the outer side of the inner rotor part, and the permanent magnets of each permanent magnet module of the outer rotor part are vertically mounted on the inner side of the outer rotor part;

wherein the stator further comprises a fixing ring, and the stator iron cores are circularly distributed on the fixing ring, wherein the stator further comprises a fixed support, which fixes the stator iron cores on the fixing ring; the stator iron cores are in an I-shaped structure, which includes a first arch part, a second arch part and a center part connecting the first arch part and the second arch part, wherein coils are wound in the middle part with slots at both sides, the first arch part faces towards the outer rotor part, and the second arch part faces towards the inner rotor part, wherein a fixing hole of the first arch part vertically runs through the first arch part, and the fixing support runs through the fixing hole and is connected and fixed to the fixing ring, and wherein the first arch part includes two concave surfaces curved toward the fixing hole and away from the adjacent stator iron cores.

2. The new type of mixed-wave permanent magnet energy-saving motor according to claim 1, the angle of inclination of the inclinedly mounted permanent magnets is 5 to 15 degrees.

3. The new type of mixed-wave permanent magnet energy-saving motor according to claim 1, further comprising a rotating shaft, wherein the rotating shaft is connected to the inner rotor part, connected to a frontend cover by rotation of a bearing after passing through the frontend cover, and the stator is fixedly mounted on the frontend cover.

* * * * *